(12) United States Patent
Branscome et al.

(10) Patent No.: US 10,729,135 B2
(45) Date of Patent: *Aug. 4, 2020

(54) METHODS OF CONTROLLING PESTS USING TERPENDOLES

(71) Applicant: Valent BioSciences LLC, Libertyville, IL (US)

(72) Inventors: Deanna Branscome, Lake Villa, IL (US); Daniel F. Heiman, Libertyville, IL (US); Jose Maria Sanchez Lopez, Leon (ES); Joseph H. Lustig, Lake Barrington, IL (US); Gary T. Wang, Libertyville, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/141,164

(22) Filed: Sep. 25, 2018

(65) Prior Publication Data

US 2019/0098900 A1     Apr. 4, 2019

Related U.S. Application Data

(60) Provisional application No. 62/566,012, filed on Sep. 29, 2017.

(51) Int. Cl.
*A01N 43/90* (2006.01)
(52) U.S. Cl.
CPC .................... *A01N 43/90* (2013.01)
(58) Field of Classification Search
CPC ...................................... A01N 43/90
USPC ............................................. 514/1
See application file for complete search history.

(56) References Cited

U.S. PATENT DOCUMENTS

| 4,973,601 A * | 11/1990 | Dowd .................. A01N 49/00 514/410 |
| 2007/0218461 A1 | 9/2007 | Bryan et al. |
| 2019/0098904 A1* | 4/2019 | Vinuesa Navarro ..... C12N 1/14 |

OTHER PUBLICATIONS

International Search Report and Written Opinion dated Dec. 6, 2018.
Motoyama et al. "Terpendole E, a Kinesin Eg5 Inhibitor, Is a Key Biosynthetic Intermediate of Indole-Diterpenes in the Producing Fungus Chaunopycnis alba" Chemistry & Biology. Dec. 20, 2012 (Dec. 20, 2012) vol. 19, p. 1611-1619; p. 1611, left col., para 2, p. 1617, Figure 6.

* cited by examiner

*Primary Examiner* — Yong L Chu
(74) *Attorney, Agent, or Firm* — Wood, Phillips, Katz, Clark & Mortimer

(57) ABSTRACT

The present invention is directed to a method of controlling a pest comprising applying an effective amount of one or more terpendoles to the pest or an area in need of pest control. The present invention is further directed to a method of controlling a pest comprising applying an effective amount of one or more compounds having the following chemical structure

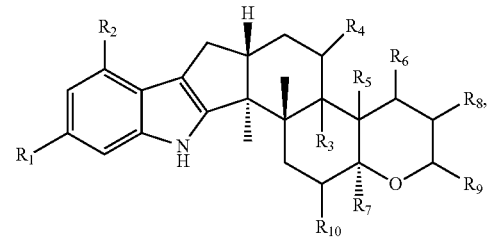

to the pest or an area in need of pest control.

6 Claims, No Drawings

METHODS OF CONTROLLING PESTS USING TERPENDOLES

FIELD OF THE INVENTION

The present invention relates to a method of controlling a pest comprising applying an effective amount of one or more terpendoles to the pest or an area in need of pest control.

The present invention further relates to a method of controlling a pest comprising applying an effective amount of one or more compounds having the following chemical structure

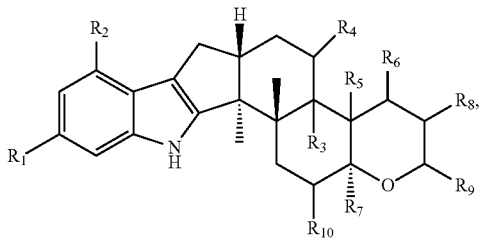

to the pest or an area in need of pest control.

BACKGROUND OF THE INVENTION

Arthropod pests are one of the major threats to human welfare and exert continued stress on the food supply via herbivory, fouling and disease transmission. Synthetic insecticides played a significant role and, in many ways, ushered in modern agriculture and pest control. However, there is increasing pressure from the public and from regulatory agencies to reduce or eliminate the exclusive use of synthetic chemical in the control of agricultural arthropod pests. The widespread use of available insecticides has resulted in the development of resistant insect populations. Insecticide resistance is a complex phenomenon manifested in a diverse array of physiological and/or behavioral mechanisms. Major mechanisms that are responsible for the development of insecticide resistance are metabolic detoxification, target site mutation, reduced cuticular penetration and behavioral avoidance. Novel classes of natural insecticides are needed to combat the ever-increasing number of resistant insect species and populations.

Indole-diterpenes are a natural, structurally diverse group of secondary metabolites with a common cyclic diterpene backbone derived from geranylgeranyl diphosphate and an indole group derived from indole-3-glycerol phosphate. Terpendoles are a specific class of indole-diterpene alkaloids produced by fungi that were first discovered by Huang et al. when screening for acyl-CoA:cholesterol acyltransferase inhibitors. Huang et al. Terpendoles, Novel ACAT inhibitors produced by *Albophoma yamanashiensis* I. production, isolation and biological properties, *J Antibiot* (Tokyo). 1995 January, 48(1), 1-4. Specifically, Huang et al. discovered terpendoles A-D. Since that time, 10 additional terpendoles have been described in the literature and termed terpendoles E-M. To date, terpendoles have been further discovered to inhibit motor activation of mitotic kinesin Eg5. See, Nakazawa J. et al., A novel action of terpendole E on the motor activity of mitotic Kinesin Eg5, *Chem Biol*, 2003 February, 10(2), 131-137. Due to its role in inhibition mitotic kinesin, terpendole E is currently being researched as a possible anti-cancer drug. However, there is no known application of terpendoles that would benefit humans.

Given that there is currently no known use for terpendoles and also given that resistance is problematic for insect pest populations, we assert that there is a need in the art for novel uses of terpendoles as natural pesticides.

SUMMARY OF THE INVENTION

The present invention is directed to a method of controlling a pest comprising applying an effective amount of one or more terpendoles to the pest or an area in need of pest control.

The present invention is further directed to a method of controlling a pest comprising applying an effective amount of one or more compounds having the following chemical structure

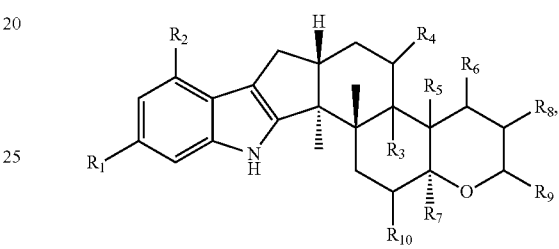

to the pest or an area in need of pest control.

DETAILED DESCRIPTION OF THE INVENTION

According to the present invention terpendoles are an effective pesticide. This discovery is unexpected as no known use for terpendoles had previously been discovered.

As used herein "terpendole A" refers to the following structure

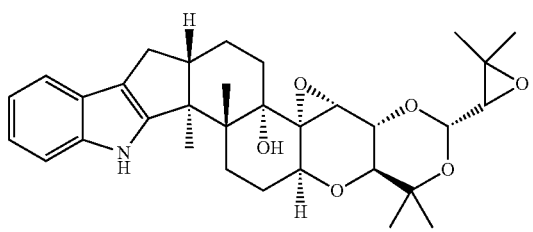

with CAS number 156967-64-5.

As used herein "terpendole B" refers to the following structure

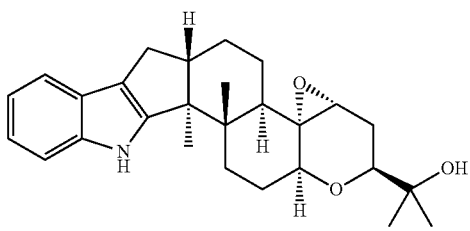

with CAS number 156967-67-8.

As used herein "terpendole C" refers to the following structure

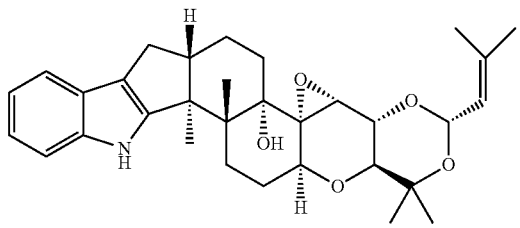

with CAS number 156967-65-6.

As used herein "terpendole D" refers to the following structure

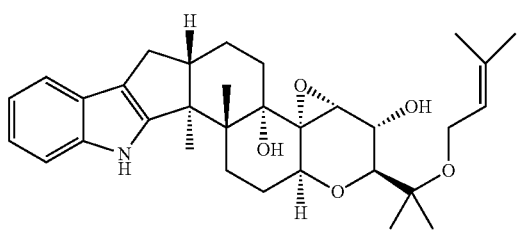

with CAS number 156967-66-7.

As used herein "terpendole E" refers to the following structure

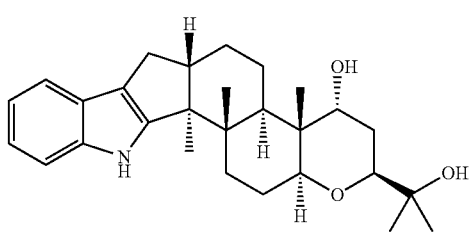

with CAS number 167427-23-8.

As used herein "terpendole F" refers to the following structure

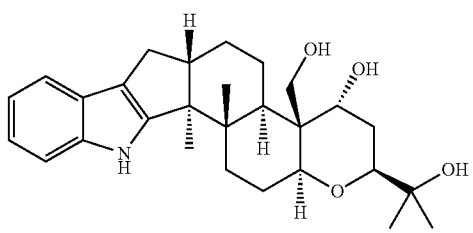

with CAS number 167427-24-9.

As used herein "terpendole G" refers to the following structure

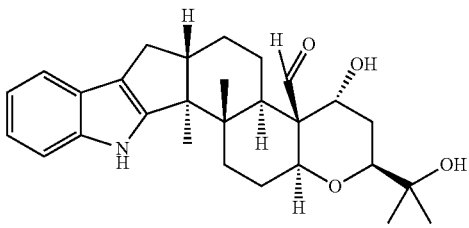

with CAS number 167427-25-0.

As used herein "terpendole H" refers to the following structure

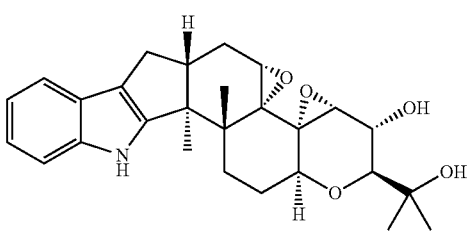

with CAS number 156967-69-0.

As used herein "terpendole I" refers to the following structure

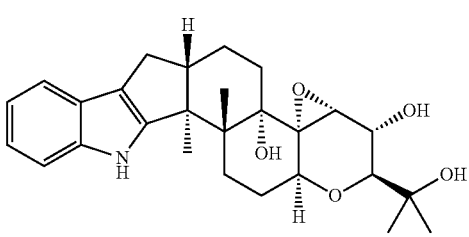

with CAS number 167612-17-1.

As used herein "terpendole J" refers to the following structure

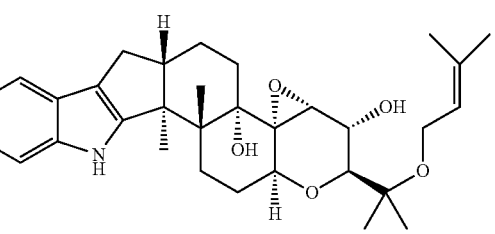

with CAS number 167427-26-1.

As used herein "terpendole K" refers to the following structure

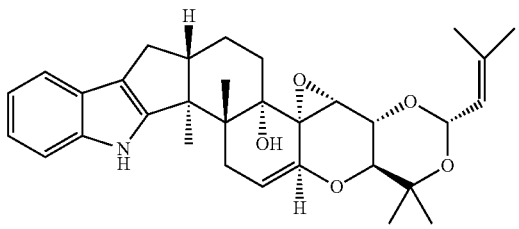

with CAS number 167427-27-2.

As used herein "terpendole L" refers to the following structure

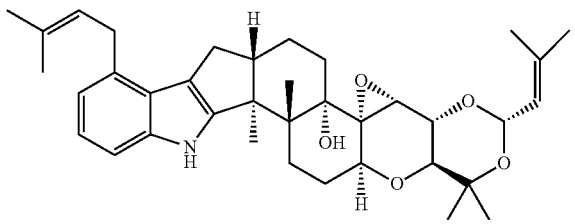

with CAS number 167612-18-2.

As used herein "terpendole M" refers to the following structure

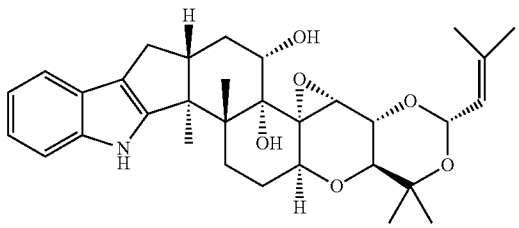

with CAS number 222400-32-0.

As used herein "terpendole N" refers to the following structure

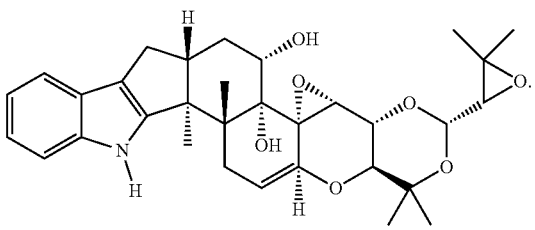

As used herein "terpendole O" refers to the following structure

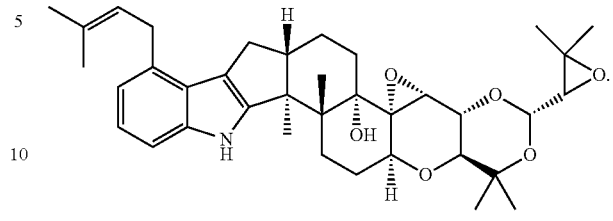

As used herein "terpendole P" refers to the following structure

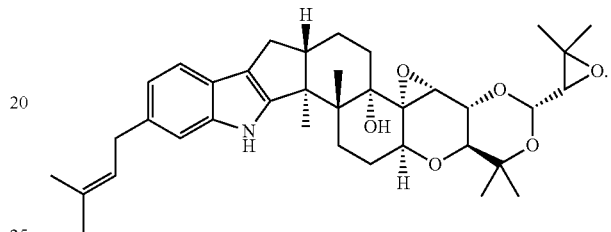

The one or more terpendoles of the present invention can be applied by any convenient means. Those skilled in the art are familiar with the modes of application including but not limited to, spraying, brushing, soaking, in-furrow treatments, drip irrigation, granule application, seed treatment, pressurized liquids (aerosols), fogging or side-dressing.

As used herein, "to control" a pest or "controlling" pest(s) refers to killing, incapacitating, repelling, or otherwise decreasing the negative impact of the pest on plants or animals to a level that is desirable to the grower, applicator or user.

As used herein, "composition" refers to one or more active ingredients in a carrier. The carrier may be a liquid, a semi-solid, a solid or a gas and may contain additional ingredients. For example, a fermentation broth is a suitable carrier for the present invention.

As used herein, "an area in need of pest control" refers to any area that the pest is present during any life stage. One environment likely to be treated by the methods of the present invention includes the plants that the pest is living on and/or the surrounding soil. The pest's environment may also include an area where plants are grown, harvested, or in gardens, fields, greenhouses, or other buildings, and various indoor surfaces and structures, such as furniture including beds, and furnishings including books, clothing, etc.

As used herein, all numerical values relating to amounts, weight percentages and the like are defined as "about" or "approximately" each particular value, namely, plus or minus 10%. For example, the phrase "about 5,000 parts per million" is to be understood as "from 4,500 to 5,500 parts per million." Therefore, amounts within 10% of the claimed values are encompassed by the scope of the claims.

The term "effective amount" means the amount of the one or more terpendoles that will control the target pest. The "effective amount" will vary depending on the terpendole concentration, the type of pest(s) being treated, the severity of the pest infestation, the result desired, and the life stage of the pest during treatment, among other factors. Thus, it is not always possible to specify in advance an exact "effective amount." However, an appropriate "effective amount" in any individual case may be determined by one of ordinary skill in the art.

The articles "a," "an" and "the" are intended to include the plural as well as the singular, unless the context clearly indicates otherwise. For example, the methods of the present invention are directed to controlling "pest" but this can include control of a multiple pests (such as a more than one insect or more than one insect species or more than one mite or more than one mite species).

In one embodiment, the present invention is directed to a method of controlling a pest comprising applying an effective amount of one or more terpendoles to the pest or an area in need of pest control.

In a preferred embodiment, the pest is an arthropod pest, more preferably an insect or a mite. As used herein, "arthropod" refers to pests that belong to the Phylum Arthropoda. As used herein, "insect" refers to pests that belong to the Class Insecta. As used herein, "mite" refers to pests that belong to the Subclass Acari of the Class Arachnida.

In another preferred embodiment, the pest is an aphid. As used herein, "aphid" refers to pests that belong to the Family Aphididae. Exemplary aphids include cotton aphid (*Aphis gossypii*), foxglove aphid (*Aulacorthum solani*), cabbage aphid (*Brevicoryne brassicae*), birdcherry-oat aphid (*Rhopalosiphum padi*) and green peach aphid (*Myzus persicae*).

In another preferred embodiment, the pest is a lepidopteran. As used herein, "lepidopteran" refers to pests that belong to the Order Lepidoptera including moths and their larval stages. Exemplary lepidopterans include diamondback moth (*Plutella xylostella*) and common cutworm (*Spodoptera litura*).

In another preferred embodiment, the pest is a thrips. As used herein, "thrips" refers to pests that belong to the Family Thripidae. Exemplary thrips include western flower thrips (*Frankliniella occidentalis*).

In another preferred embodiment, the pest is a whitefly. As used herein, "whitefly" refers to pests that belong to the Family Aleyrodidae. Exemplary whiteflies include silverleaf whitefly and tobacco whitefly (*Bemisia tabaci*).

In another preferred embodiment, the pest is a planthopper. As used herein, "planthopper", refers to pests that belong to the Infraorder Fulgoromorpha of the Order Hemiptera. Exemplary planthoppers include brown rice planthopper (*Nilaparvata lugens*).

In another preferred embodiment, the pest belongs to the infraclass Neoptera of the Class Insecta, the Subfamily Aphidinae of the Family Aphididae or the Parvorder Heteroneura of the Family Lepidoptera.

In another preferred embodiment, the area in need of pest control is a plant.

In another preferred embodiment, the area in need of pest control is an area that includes but is not limited to, where crops are grown, harvested, stored, processed, packed or shipped.

Terpendoles include, but are not limited to, compounds having the following chemical structure

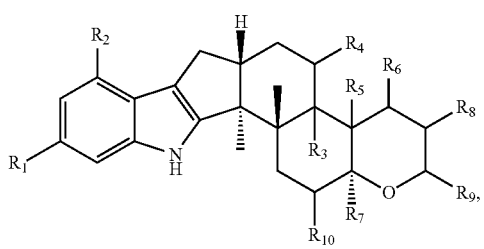

wherein:
$R^1$ and $R^2$ are each independently H or 2-methyl-2-butene;
$R^3$ and $R^4$ are each independently H or —OH or $R^3$ and $R^4$ are taken together to form an epoxide bridge;
$R^5$ is $CH_3$, —$CH_2$—OH, or —CH=O and $R^6$ is —OH or $R^5$ and $R^6$ are taken together to form an epoxide bridge;
$R^7$ and $R^{10}$ are each H or absent, wherein if $R^7$ and $R^{10}$ are absent then carbon atoms adjacent to $R^7$ and $R^{10}$ are double bonded; and
$R^8$ is H or —OH and $R^9$ is —C—$(CH_3)_2$—O—$CH_2$—CH=C—$(CH_3)_2$, —C—$(CH_3)_2$—OH or $R^8$ and $R^9$ taken together form

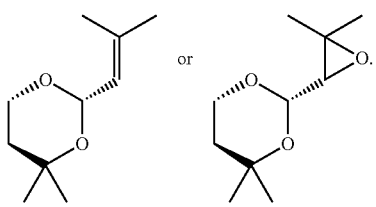

In a preferred embodiment, the one or more terpendoles are selected from the group consisting of terpendole A, terpendole B, terpendole C, terpendole D, terpendole E, terpendole F, terpendole G, terpendole H, terpendole I, terpendole J, terpendole K, terpendole L, terpendole M, terpendole N, terpendole O and terpendole P, more preferably the one or more terpendoles is selected from terpendole A, terpendole C, terpendole K, terpendole N, terpendole O and terpendole P.

The one or more terpendoles of the present invention may be applied at a concentration from about 1 to about 10,000 parts per million ("ppm"), preferably from about 4 to about 5,000 parts per million, more preferably from about 4 to about 100 ppm.

In another embodiment, the one or more terpendoles are an active ingredient in a composition.

Other components that enhance the biological activity or application of these ingredients may optionally be included.

The following example is intended to illustrate the present invention and to teach one of ordinary skill in the art how to use the one or more terpendoles of the invention and is not intended to be limiting in any way.

EXAMPLES

Example 1

Isolation of Terpendoles from *Tolypocladium inflatum* Fermentation Broth

Fermentation broth of *Tolypocladium inflatum* was extracted with ethyl acetate. Evaporation of the ethyl acetate solution gave a dark thick syrup. This material was re-dissolved in an appropriate amount of ethyl acetate-methanol (2:1) mixture, filtered and combined with an appropriate amount of silica gel. The mixture was then evaporated on a rotary evaporator until dry. The resulting solid was chromatographed on a silica gel column with a slow gradient of ethyl acetate in hexane. The fractions containing terpendoles, as determined with liquid chromatography mass spectrometry (LC-MS) analysis, were combined and evaporated. The resulting material was re-purified with silica gel chromatography or high-pass liquid chromatography, as appropriate to isolate the individual terpendoles.

Of the terpendoles found, terpendole A, terpendole C, terpendole J and terpendole K were previously described in literature. These compounds were identified by comparing molecular weight, ¹H nuclear magnetic resonance ("NMR") and ¹³C NMR spectra with the reported spectra (Huang, et. al, *J. Antibiotics*, 1995, 48, 5; Tomoda, et al., *J. Antibiotics*, 1995, 48, 793), as well as two-dimensional NMR COSY, NOESY, HSQC and HMBC. Spectral data of terpendole N, terpendole O and terpendole P have not previously been reported. The structural determination of these three compounds is described in Examples 2-4, below. The relative stereo configurations of these compounds were established based on the structures of known terpendoles.

Example 2

Structure Determination of Terpendole N

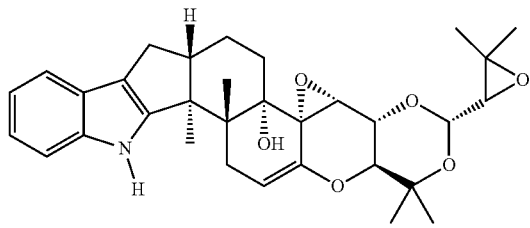

Mass spectrum of this compound indicates a molecular weight of 533. ¹H NMR (400 MHz, CDCl₃): δ7.73 (s, 1H, NH), 7.48 (d, 1H), 7.29 (d, 1H), 7.07 (m, 2H), 5.39 (dd, 1H), 4.58 (d, 1H), 4.10 (d, 1H), 3.92 (s, 1H), 3.90 (d, 1H), 3.20 (d, 1H), 2.88 (d, 1H), 2.73-2.71 (m, 2H), 2.47-2.43(m, 1H), 2.02-1.80 (m, 2H), 1.69-1.46 (m, 1H), 1.37-1.99 (m, 17H, including CH₃ at 1.35, 1.34, 1.33, 1.31 and 1.24), 1.13 (s, 3H). ¹³C NMR (100 MHz, CDCl₃): δ151.57, 144.40, 139.86, 125.18, 120.60, 119.74, 118.59, 117.65, 111.47, 106.19, 95.61, 76.24, 75.22, 73.13, 71.09, 64.87, 62.58, 60.14, 57.86, 50.70, 49.94, 43.78, 30.58, 27.72, 27.26, 24.52, 20.55, 20.00, 19.16, 16.50, 16.21. In comparison with the spectrum of terpendole A, this compound has one extra peak in the aromatic/vinyl region of the ¹H NMR at 5.39 ppm (dd) and two extra sp2 carbon signals at 144.40 (C/CH₂ type) and 106.19 (CH/CH₃ type). These data confirm that this compound has a tri-substituted carbon-carbon double bond. Direct evidence for assigning this double bond at C6═C7 was found in the 2D HMBC spectrum, with the C6 vinyl proton at 5.39 ppm showing strong interaction with neighboring C4, C12 and C7. Other NMR spectra, including 2D COSY, NOESY and HSQC were used to assign the proton and carbon signals.

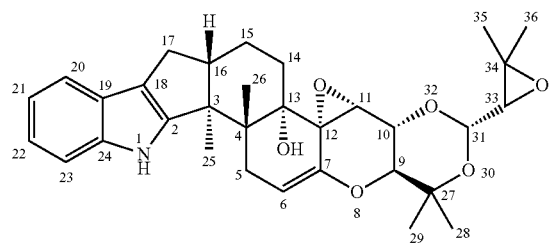

Example 3

Structure Determination of Terpendole O

Mass spectrum of this compound indicates a molecular weight of 603. ¹H NMR (400 MHz, CDCl₃): δ7.73 (s, 1H, NH), 7.13 (d, 1H), 7.00 (t, 1H), 6.84 (d, 1H), 5.40 (m, 1H), 4.62 (d, 1H), 4.34 (t, 1H), 3.86 (d, 1H), 3.67 (s, 1H), 3.61-3.59 (m, 3H), 2.88 (d, 1H), 2.83-2.50 (m, 3H), 2.26 (m, 1H), 1.94-1.90 (m, 1H), 1.756 (s, 3H), 1.754 (s, 3H), 1.67-1.53 (m, 3H), 1.38-1.23 (m, 15H, including CH₃ at 1.33, 1.32, 1.30 and 1.27), 1.21 (s, 3H), 1.13 (s, 3H). ¹³C NMR (100 MHz, CDCl₃): δ151.06, 139.69, 133.11, 131.81, 124.51, 123.71, 120.96, 119.00, 117.15, 109.28, 95.49, 78.19, 75.06, 71.62, 71.17, 71.10, 67.90, 62.59, 60.97, 57.78, 50.39, 50.16, 42.45, 32.02, 30.38, 29.03, 28.09, 28.04, 27.46, 25.79, 24.57, 20.55, 19.17, 18.86, 17.97, 16.46, 15.97.

Evidence for the presence of a (CH₃)₂C═CHCH₂— moiety was provided by strong coupling of the vinyl proton at 5.40 ppm with the benzylic CH₂ at 3.60 ppm and with the allylic methyl groups at 1.756 and 1.754 ppm in the 2D-COSY spectrum. Further evidence was provided by the strong interaction of the benzylic CH₂ at 3.60 ppm with C38 at 123.71 ppm and C39 at 131.81 ppm in 2D-HMBC spectrum. That the (CH₃)₂C═CHCH₂— moiety is attached to C20 was derived from the interaction of the benzylic CH₂ at 3.60 ppm with C21 at 119.00 ppm. Other NMR spectra, including 2D COSY, NOESY and HSQC were used to assign the proton and carbon signals.

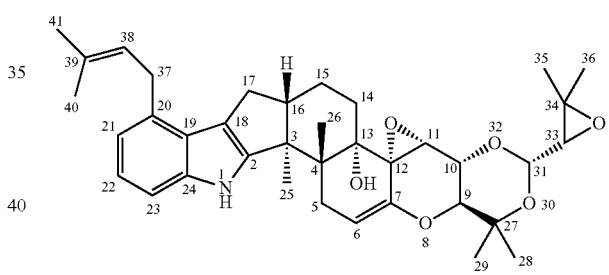

Example 4

Structure Determination of Terpendole P

Mass spectrum of this compound indicates a molecular weight of 603. ¹H NMR (400 MHz, CDCl₃): δ7.63 (s, 1H, NH), 7.33 (d, 1H), 7.01 (s, 1H), 6.90 (d, 1H), 5.36 (m, 1H), 4.62 (d, 1H), 4.33 (t, 1H), 3.85 (d, 1H), 3.67 (s, 1H), 3.59 (d, 1H), 3.41 (d, 2H), 2.88 (d, 1H), 2.81-2.60 (m, 4H), 2.40-2.22 (m, 2H), 1.739 (s, 3H), 1.736 (s, 3H), 1.67-1.41 (m, 3H), 1.38-1.23 (m, 11H, including CH₃ at 1.32, 1.31, and 1.30), 1.25 (s, 3H), 1.21 (s, 3H), 1.10 (s, 3H). ¹³C NMR (100 MHz, CDCl₃): δ151.16, 140.24, 134.42, 131.74, 124.23, 123.33, 120.63, 118.54, 117.52, 110.78, 95.48, 78.16, 75.05, 71.62, 71.16, 71.09, 67.89, 62.75, 60.96, 57.78, 50.67, 49.98, 42.44, 34.54, 30.40, 28.08, 28.03, 27.44, 27.23, 25.77, 24.57, 20.59, 19.17, 18.82, 17.81, 16.46, 15.94.

Evidence for the presence of a (CH₃)₂C═CHCH₂— moiety was provided by strong coupling of the vinyl proton at 5.36 ppm with the benzylic CH₂ at 3.41 ppm and with the allylic methyl groups at 1.739 and 1.736 ppm in the 2D-COSY spectrum. Further evidence was provided by the strong interaction of the benzylic $CH_2$ at 3.41 ppm with C38 at 124.23 ppm and C39 at 131.74 ppm in 2D-HMBC spectrum. Unlike in terpendole O, the benzylic $CH_2$ at 3.41 ppm also has strong interaction with C22 at 134.42 ppm and C23 at 110.79 ppm in the 2D HMBC spectrum, lending support to attachment of $(CH_3)_2C$=$CHCH_2$— moiety to C22. Other NMR spectra, including 2D COSY, NOESY and HSQC were used to assign the proton and carbon signals.

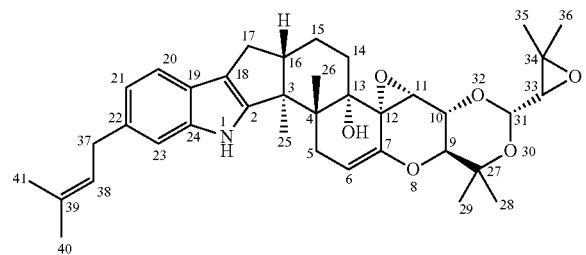

Example 5

Insecticidal Activity of Terpendoles

Method

Biological efficacy assays utilizing terpendoles were conducted on green peach aphids (*Myzus persicae*). Specifically, terpendole A, terpendole C, terpendole J, terpendole K, terpendole N, terpendole O and terpendole P were each separately applied in serial dilutions to determine the concentration at which 50% control of green peach aphids occurred over a period of 24-48 hours ("$LC_{50}$"). Radish leaves infested with green peach aphids were treated, top and bottom, with a total of 500 μl of an aerosolized terpendole dilution. Treated, aphid infested leaves were held in greenhouse conditions and evaluated for efficacy at 24 and 48 h.

Results

As seen in Table 1 below, each of terpendole A, terpendole C, terpendole J, terpendole K, terpendole N, terpendole O and terpendole P, effectively controlled green peach aphids.

Specifically, terpendoles have an $LC_{50}$ as low as 4 parts per million ("ppm") against *Myzus persicae*.

TABLE 1

| $LC_{50}$ of Terpendoles on Green Peach Aphids | |
|---|---|
| Compound | $LC_{50}$ (ppm) |
| Terpendole A | 7 |
| Terpendole C | 20 |
| Terpendole J | 5,183 |
| Terpendole K | 44 |
| Terpendole N | 4 |
| Terpendole O | 105 |
| Terpendole P | 67 |

Example 6

Insecticidal Activity of Terpendole C

Method

A bioefficacy assay utilizing terpendole C was conducted on the lepidopterans: diamondback moth (*Plutella xylostella*) and common cutworm (*Spodoptera litura*): the whitefly, tobacco whitefly (*Bemisia tabaci*) the thrips, western flower thrips (*Frankliniella occidentalis*); the planthopper, brown rice planthopper (*Nilaparvata lugens*); the aphids, cotton aphid (*Aphis gossypii*), foxglove aphid (*Aulacorthum solani*), cabbage aphid (*Brevicoryne brassicae*), birdcherry-oat aphid (*Rhopalosiphum padi*), green peach aphid (*Myzus persicae*); and the mite, two-spotted spider mite (*Tetranychus urticae*). Specifically, terpendole C was diluted with acetone and 5% Tween® 20 and finally diluted with water to prepare spray solutions. Terpendole C was then applied to plants as a foliar spray at 500, 200, 50, 12.5, 3.1, 1, 0.8 and/or 0.2 ppm and/or as a soil treatment at 2,500, 1,000, 250, 63, 16, 4 and/or 1 ppm. Pests were then placed on the plant or in the soil. Certain pests were at particular life cycle stages during application as indicated in Tables 2 and 3, below. Further, mortality and appetite suppression were recorded at 6, 7 and/or 13 days after treatment ("DAT") and are reported in Tables 2 and 3, below, respectively. A score of 0 does not indicate no mortality or no feeding suppression but instead a range of mortality or feeding suppression less than 29% or 5%, respectively.

TABLE 2

| Mortality Rates of Various Insects | | | | | | | | | | | |
|---|---|---|---|---|---|---|---|---|---|---|---|
| Pest | Plant | Target Stage | DAT | 500 | 200 | 50 | 12.5 | 3.1 | 1 | 0.8 | 0.2 |
| Diamondback moth | Cabbage | 3rd instar | 6 | 4 | 3 | 1 | 1 | — | — | — | — |
| Common cutworm | Cabbage | 4th instar | 6 | 0 | 0 | 0 | 0 | — | — | — | — |
| Tobacco whitefly | Cabbage | 1st instar | 7 | 0 | 0 | 0 | 0-2 | 1 | 1 | 0 | — |
| Western flower thrips | Kidney Bean | 1st-2nd instar | 6 | 0 | 0 | 0 | 0 | 0 | — | 0 | 0 |
| Brown rice plant hopper | Rice | 3rd-4th instar | 6 | 0 | 0 | 0 | 0-1 | 0 | — | 0 | 0 |
| Cotton aphid | Cucumber | All | 6 | 4 | 4 | 3 | 3-4 | 3 | — | 2 | 0 |
| Foxglove aphid | Kidney Bean | Adult | 6 | 2 | 1 | 0 | 0 | — | — | — | — |
| Cabbage aphid | Cabbage | All | 6 | — | 4 | 4 | 4 | 2 | — | 2 | — |
| Bird cherry-oat aphid | Wheat | All | 6 | — | 3 | 2 | 1 | 0 | — | 0 | — |

TABLE 2-continued

| | | | | Mortality Rates of Various Insects | | | | | | | |
|---|---|---|---|---|---|---|---|---|---|---|---|
| Pest | Plant | Target Stage | DAT | 500 | 200 | 50 | 12.5 | 3.1 | 1 | 0.8 | 0.2 |
| Green peach aphid | Cabbage | All | 6 | — | 4 | 3 | 2 | 1 | — | 0 | — |
| Two-spotted spider mite | Kidney Bean | All | 7 | 0 | 0 | 0 | 0 | — | — | — | — |
| | | | 13 | 0 | 0 | 0 | 0 | — | — | — | — |

0 = about 29% mortality or less
1 = about 50% mortality
2 = about 75% mortality
3 = about 90% mortality
4 = 100% mortality

TABLE 3

| | | Appetite Suppression of Various Insects | | | | | |
|---|---|---|---|---|---|---|---|
| Pest | Plant | Target Stage | DAT | 500 | 200 | 50 | 12.5 |
| Diamondback moth | Cabbage | 3rd instar | 6 | 4 | 3 | 0 | 0 |
| Common cutworm | Cabbage | 4th instar | 6 | 4 | 4 | 4 | 4 |
| Western flower thrips | Kidney Bean | 1st-2nd instar | 6 | 3-4 | 3-4 | 3-4 | 3-4 |
| Foxglove aphid | Kidney Bean | Adult | 6 | 2 | 0 | 0 | 0 |
| Two-spotted spider mite | Kidney Bean | All | 7 | 0 | 0 | 0 | 0 |
| | | | 13 | 0 | 0 | 0 | 0 |

0 = no to little suppression
1 = about 10% suppression
2 = about 25% suppression
3 = about 60% suppression
4 = 70-100% suppression Results As seen in Table 2 above, terpendole C effectively controlled the aphids including: cotton aphids, foxglove aphids, cabbage aphids, birdcherry-oat aphids and green peach aphids. Further, terpendole C effectively controlled the lepidopterans, including diamondback moth and common cutworm, either by killing the larvae or suppressing the appetite of the larvae. Finally, terpendole C significantly controlled the whitefly and the thrips.

What is claimed is:

1. A method of controlling an aphid comprising applying an effective amount of one or more terpendoles to the pest or an area in need of aphid control, wherein each of the one or more terpendoles have the following chemical structure

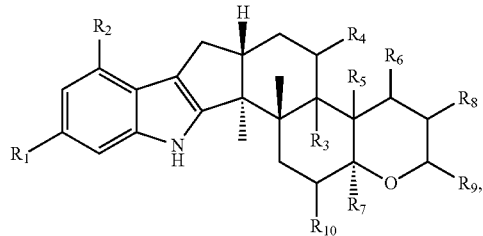

wherein:
$R^1$ and $R^2$ are each independently H or 2-methyl-2-butene;
$R^3$ and $R^4$ are each independently H or —OH or $R^3$ and $R^4$ are taken together to form an epoxide bridge;
$R^5$ is $CH_3$, —$CH_2$—OH, or —CH=O and $R^6$ is —OH or $R^5$ and $R^6$ are taken together to form an epoxide bridge;
$R^7$ and $R^{10}$ are each H or absent, wherein if $R^7$ and $R^{10}$ are absent then carbon atoms adjacent to $R^7$ and $R^{10}$ are double bonded; and
$R^8$ is H or —OH and $R^9$ is —C—$(CH_3)_2$—O—$CH_2$—CH=C—$(CH_3)_2$, —C—$(CH_3)_2$—OH or $R^8$ and $R^9$ taken together form

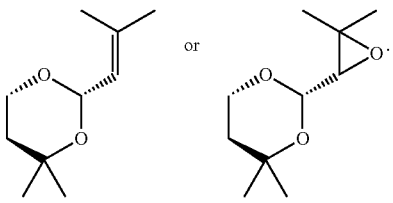

2. The method of claim 1, wherein the aphid is selected from the group consisting of cotton aphid (*Aphis gossypii*), foxglove aphid (*Aulacorthum solani*), cabbage aphid (*Brevicoryne brassicae*), birdcherry-oat aphid (*Rhopalosiphum padi*) and green peach aphid (*Myzus persicae*).

3. The method of claim 1, wherein the effective concentration is from about 1 to about 10,000 parts per million.

4. The method of claim 1, wherein the effective concentration is from about 4 to about 5,000 parts per million.

5. The method of claim 1, wherein the one or more terpendoles are selected from the group consisting of terpendole A, terpendole B, terpendole C, terpendole D, terpendole E, terpendole F, terpendole G, terpendole H, terpendole I, terpendole J, terpendole K, terpendole L, terpendole M, terpendole N, terpendole O and terpendole P.

6. The method of claim 1, wherein the one or more terpendoles is selected from terpendole A, terpendole C, terpendole K, terpendole N, terpendole O and terpendole P.

* * * * *

UNITED STATES PATENT AND TRADEMARK OFFICE
CERTIFICATE OF CORRECTION

| | | |
|---|---|---|
| PATENT NO. | : 10,729,135 B2 | Page 1 of 1 |
| APPLICATION NO. | : 16/141164 | |
| DATED | : August 4, 2020 | |
| INVENTOR(S) | : Deanna Branscome et al. | |

It is certified that error appears in the above-identified patent and that said Letters Patent is hereby corrected as shown below:

On the Title Page

Item (72) Add Inventor: Daniel C. Leep, Linderhurst, IL (US)

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*